US012710074B2

(12) United States Patent
Müller

(10) Patent No.: US 12,710,074 B2
(45) Date of Patent: Aug. 18, 2026

(54) CONSTANT VELOCITY BALL JOINT

(71) Applicant: GKN Driveline Deutschland GmbH, Offenbach am Main (DE)

(72) Inventor: Peter Müller, Wächtersbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 493 days.

(21) Appl. No.: 18/067,160

(22) Filed: Dec. 16, 2022

(65) Prior Publication Data

US 2023/0193960 A1 Jun. 22, 2023

(30) Foreign Application Priority Data

Dec. 22, 2021 (DE) ........................ 102021134247.3

(51) Int. Cl.
*F16D 3/223* (2011.01)
*F16D 3/227* (2006.01)

(52) U.S. Cl.
CPC ............. *F16D 3/223* (2013.01); *F16D 3/227* (2013.01); *F16D 2003/22309* (2013.01); *Y10S 464/906* (2013.01)

(58) Field of Classification Search
CPC ........... F16D 3/223; F16D 2003/22309; F16D 3/227; Y10S 464/906
USPC ................................................. 464/146, 143
See application file for complete search history.

(56) References Cited

U.S. PATENT DOCUMENTS 1,294,583 A * 2/1919 Whisler .................. F16D 3/221 464/143
2,046,584 A * 7/1936 Rzeppa .................. F16D 3/223 464/146
2,150,952 A * 3/1939 Ward .................. B60K 17/165 464/146
3,557,572 A 1/1971 Aucktor et al.
4,149,392 A * 4/1979 Kimberlin ................ F16D 3/24 464/146
6,666,771 B2 * 12/2003 Boutin .................... F16D 3/226 464/146
8,167,729 B2 * 5/2012 Frost ......................... F16C 3/02 464/146
9,169,877 B2 10/2015 Hirukawa et al.
10,830,283 B2 * 11/2020 Houis ..................... F16D 3/845
2015/0275980 A1 10/2015 Hirukawa et al.
(Continued)

FOREIGN PATENT DOCUMENTS

AT 277675 B 1/1970
DE 202013003111 U1 6/2013
(Continued)

OTHER PUBLICATIONS

Japan Patent Office Notice of Reasons for Refusal for related application No. JP2022-196238 mailed Feb. 27, 2020 (6 pages; with English machine translation).
(Continued)

*Primary Examiner* — Greg Binda
(74) *Attorney, Agent, or Firm* — Reising Ethington P.C.

(57) ABSTRACT

Constant-velocity ball joint, having at least a joint outer part with an axis of rotation and with outer ball tracks and with outer center lines, a joint inner part with inner ball tracks and inner center lines, and a large number of torque-transmitting balls which are each guided in mutually associated outer ball tracks and inner ball tracks.

12 Claims, 3 Drawing Sheets

(56) References Cited

U.S. PATENT DOCUMENTS

| | | | |
|---|---|---|---|
| 2020/0116205 | A1 | 4/2020 | Günther et al. |
| 2021/0140488 | A1 | 5/2021 | Benner et al. |
| 2021/0172481 | A1 | 6/2021 | Kobayashi et al. |

FOREIGN PATENT DOCUMENTS

| | | | |
|---|---|---|---|
| JP | S4838653 | B1 | 11/1973 |
| JP | 63114833 | A | 5/1988 |
| JP | 2007247666 | A | 9/2007 |
| JP | 2007309366 | A | 11/2007 |
| JP | 2010019345 | A | 1/2010 |
| JP | 2019120388 | A | 7/2019 |
| JP | 2019190550 | A | 10/2019 |

OTHER PUBLICATIONS

JP Office Action for JP Application No. 2022-196238 dated Aug. 27, 2024 (6 pages).
DE Office Action for DE Application No. 102021134247.3 dated Aug. 12, 2022 (6 pages).
KR Allowance for KR Application No. 10-2022-0180856 dated Feb. 21, 2025 (3 pages).
CN Office Action for CN Application No. 202211646706.6 dated Sep. 29, 2025 (18 pages).

* cited by examiner 125
122
121
101
102
104
103
109
107
106

129
108
124
105
115
110
111
125
103
112
106

30
9
2
1
21
4
22
7
31
30
30
3
6
30
25

24
22
29
16
21
8
4
1
5
8
23
10
3
26
20
11
2
12
7
29
9
6

82
80
8
14
7
16
13
27
24
11
15
15
16
3
6
12
19

18
17

CONSTANT VELOCITY BALL JOINT

CROSS-REFERENCE TO RELATED APPLICATIONS

This application claims priority to German Application No. 10 2021 134 247.3, filed on Dec. 22, 2021, which application is hereby incorporated herein by reference in its entirety.

BACKGROUND

Constant-velocity ball joints are used in particular in motor vehicles in the region of longitudinal shaft arrangements but also in sideshaft arrangements. The longitudinal shafts serve to transmit the drive force from a gearbox to an axle. In particular, the gearbox is here arranged in the front region of a motor vehicle and the longitudinal shaft arrangement extending along the longitudinal axis of the motor vehicle serves to transmit the drive forces from this gearbox to a rear axle. In the case of longitudinal shaft arrangements, smaller deflection angles of the joint are generally required, in particular from 0 to 10 degrees. The sideshafts serve to transmit the drive force from a gearbox or differential to a wheel, i.e., essentially parallel to an axle of the motor vehicle. Sideshafts extend transversely to the longitudinal axis of the motor vehicle. In the case of sideshafts, larger deflection angles of the constant-velocity ball joint are generally required, in particular from 0 to 32 degrees, preferably from 3 to 20 degrees.

Constant-velocity ball joints comprise, for example, a joint outer part with an axis of rotation and outer ball tracks (external ball tracks of the constant-velocity plunging ball joint), a joint inner part with inner ball tracks (internal ball tracks of the constant-velocity plunging ball joint), a large number of torque-transmitting balls which are each guided in mutually associated outer and inner ball tracks, and possibly a cage which is provided with a large number of cage windows which each accommodate one or more balls. The cage can be guided via a spherical contact surface on the joint outer part and/or joint inner part (fixed joint). Alternatively, the cage can be guided on the joint outer part via a cylindrical contact surface (plunging joint).

In the case of a plunging joint, the joint inner part can be displaced relative to the joint outer part by a total displacement travel along the axis of rotation. The total displacement travel (i.e., the maximum travel by which the joint inner part can be displaced relative to the joint outer part) is in particular at least five millimetres in the case of a plunging joint.

At least some of the outer ball tracks and at least some of the inner ball tracks can have a track angle of inclination (of any orientation) relative to the axis of rotation or alternatively have no track angle of inclination, i.e., run parallel to the axial direction or axis of rotation. If the constant-velocity ball joint is situated in a straight position or arrangement (i.e., with no deflection of the joint inner part relative to the joint outer part), in the case of a plunging joint, displacement of the joint inner part relative to the joint outer part along the common axis of rotation is possible such that the axes of rotation remain arranged coaxially with each other.

In particular, a ball track base (i.e., in each case of the outer ball tracks the regions of the ball tracks are arranged at the greatest spacing from the axis of rotation; in each case of the inner ball tracks the regions of the ball tracks are arranged at the shortest spacing from an axis of rotation of the joint inner part) or a center line (the progression of a center point of a ball when the latter moves along a ball track) of each ball track along the displacement travel is at a respective essentially constant spacing from the axis of rotation in a radial direction. However, designs of constant-velocity ball joints are also known in which the ball track base or the center line is not at a constant spacing from the axis of rotation. The spacing from the axis of rotation is here the same in particular for opposing ball tracks but is not constant over the displacement travel or along the ball track.

In the case of deflection of the joint inner part, the joint inner part is pivoted out of the straight position (axis of rotation of the joint outer part and axis of rotation of the joint inner part are arranged coaxially with each other) into a diverging or deflected position. The axis of rotation of the joint outer part and the axis of rotation of the joint inner part then form a deflection angle (which diverges from "0" degrees).

When the joint inner part is displaced relative to the joint outer part, the balls perform a movement (for example, rolling, slipping, sliding, etc), guided by the track, in the ball tracks. The cage here ideally moves by half the extent of the displacement travel of the joint inner part relative to the joint outer part.

Because of their defined pack volume, constant-velocity plunging ball joints (or ball joints with a displacement unit) have a maximum available displacement capacity and therefore have a maximum total displacement travel between the joint outer part and joint inner part, or a greatest displacement travel between the cage and the joint inner part.

The object of a displacement unit in the ball joint is to effect the maximum displacement whilst maintaining the joint performance over the smallest possible space. Ball joints with an inner physical abutment of the joint inner part (ball hub) on the cage (ball cage) define the possible displacement of the joint components relative to each other by the maximum possible travel that a rolling body, for example a ball, can make in the outer and inner partial tracks (inner and outer ball tracks) until the described physical abutment takes place.

In the case of constant-velocity ball joints with ball tracks running parallel to the axis of rotation (i.e. with no angle of inclination of the tracks), when the joint is deflected, the balls are retained on the angle bisector via the cage. In the case of a straight joint (zero degrees of deflection), the same forces act on all the balls. In the case of a deflected joint (more than zero degrees of deflection), the forces or force progressions acting on the balls are the same for all the balls, just phase-shifted respectively, viewed over one revolution of the joint.

It is relevant for the following explanations that the "zero- or 360-degree" position of a ball in the joint (viewed along the axis of rotation into the joint inner part) is at the top and the angle then runs anticlockwise. If therefore the joint is at a zero-degree deflection angle, all the balls are stressed by the same amount and no movement of the balls takes place in the ball tracks in the axial direction. In the case of deflection of the joint (it is assumed here that the joint inner part is deflected downwards), the balls move backwards at the "zero-degree" position in the ball tracks of the joint inner part and forwards in the joint outer part. When the ball reaches the "90-degree" position, in the inner and outer ball track it is back in the center and, when it moves on to the "180-degree" position, the deviation of the balls in the ball tracks is then reversed and the ball migrates forwards in the inner ball track and backwards in the outer ball track. When it moves on into the "270-degree" position, the ball is then situated back in the central position in the inner and outer ball track (as at the "90-degree" position). An increasingly non-uniform force transmission of the ball can be observed here as the deflection angle increases over a revolution of the joint, i.e., the force which is transmitted by the ball executes an approximation of a sine wave over the revolution. The maximum transmitted force is here greater with the same torque than the constant value of the force in the case of an undeflected joint.

AT 277675 relates to a constant-speed plunging joint in which aims to solve this problem of the high variation in the force transmission. To do this, it is proposed there that the center lines of the inner ball tracks have a concave progression and the perpendicular spacing of the center lines from the axis of rotation of the joint inner part to the ends of the ball tracks is therefore increased.

Especially in the field of mass production of motor vehicles, there are rising demands on all components in terms of the structural space to be achieved, the weight and/or costs. There is therefore a constant need also to further develop joints of this type with respect to the demands mentioned.

SUMMARY

The present disclosure relates to a constant-velocity ball joint, in particular to a constant-velocity plunging ball joint. The constant-velocity (plunging) ball joint in the present case (also referred to below as the joint) is used in particular in a sideshaft or longitudinal shaft arrangement in a motor vehicle. It can furthermore be used in all further use cases in which constant-velocity ball joints have been used hitherto. The present disclosure describes a constant-velocity ball joint in which the force transmission is as uniform as possible over a ball in the case of deflection and over a revolution of the joint.

The features explained individually in the claims can be combined in any technically appropriate manner and can be supplemented by explanatory content from the description, wherein further alternative embodiments are demonstrated.

A constant-velocity ball joint is proposed, having at least

- a joint outer part with an axis of rotation, with outer ball tracks and with outer center lines,
- a joint inner part with inner ball tracks and inner center lines,
- a large number of torque-transmitting balls which are each guided in mutually associated outer ball tracks and inner ball tracks.

In the case of a straight arrangement of the constant-velocity ball joint, the outer center lines run at a constant spacing from the axis of rotation. The joint inner part and the inner center lines extend along the axis of rotation between a first front side and a second front side. At least one of the inner center lines extends between a first end present at the first front side and a second end present at the second front side and runs at a varying second spacing from the axis of rotation. A maximum value of the second spacing is arranged at a distance from the first end and the second end.

All the center lines preferably extend and run as described above.

In particular, the at least one inner center line thus can have a convex progression, wherein the second spacing of the center line reduces, starting from its maximum value and towards the ends.

Reference is made to the above embodiments of joints which can be fully included in the explanation of the joint proposed here.

It has been shown for such constant-velocity ball joints that, in the case of deflection of the joint, the highest stress on the balls occurs in the region of the "zero-degree" and the "180-degree" position. Significant homogenization of the stress on the balls can be achieved especially by the particular shape of the inner center lines which is now proposed.

In particular, the at least one inner center line can have the shape of an arc of a circle, an ellipse, a hyperbola, or a shape which can be freely determined and with which individual part-shapes are connected to one another via in each case a tangential transition. In particular, the at least one center line has a curved progression. The curvature can here be constant or alternatively also can vary. The curvature can be minimal or maximal in the region of the maximum value or at a distance from the maximum value.

In particular, the at least one inner center line can be formed by multiple part-shapes, wherein at least one part-shape comprises a straight line. In particular, other part-shapes can be formed by curved progressions. In particular, individual part-shapes can be connected to one another via in each case a tangential transition.

In particular, the second spacing at each end can be smaller than the maximum value.

In particular, the at least one inner center line can run between the maximum value and the respective end in a monotonically decreasing fashion. Monotonically decreasing means that the second spacing of the inner center line only becomes smaller, or possibly remains constant at least in some regions, starting from the maximum value and towards the respective end.

In particular, the at least one inner center line can run between the maximum value and the respective end in a strictly monotonically decreasing fashion. Strictly monotonically decreasing means that the second spacing of the inner center becomes continuously smaller starting from the maximum value and towards the respective end. Sections with constant second spacings are then not present at all.

In particular, the second spacings present at the ends can differ from each other or alternatively are of the same size.

In particular, the maximum value can be arranged at a first distance from the first end and at a second distance from the second end. The distances are the same or differ from each other.

In particular, a largest radius of the at least one inner center line can correspond to at least 1.0 times, preferably at least 1.2 times, particularly preferably at least 1.56 times, a pitch circle diameter of the balls.

The pitch circle diameter of the balls is the diameter on which the ball center points are arranged (in the case of a straight joint).

In particular, a largest radius of the at least one inner center line can correspond to no more than 50 times, in particular no more than 20 times, preferably no more than 10 times or even no more than 6.5 times a pitch circle diameter of the balls.

In an exemplary constant-velocity ball joint, the pitch circle diameter (PCD) is 60 millimetres, the diameter of the balls 16.5 millimetres and the largest radius 85 millimetres or 170 millimetres.

In particular, the constant-velocity ball joint can comprise additionally at least one cage which is provided with a large number of cage windows which each accommodate one or more of the balls.

The cage can be guided in particular with a spherical inner circumferential surface over a spherical outer circumferential surface of the joint inner part. There can be play here between the circumferential surfaces. It is therefore possible to displace the cage relative to the joint inner part along the axis of rotation only to a limited extent, in particular limited to a maximum displacement of one millimetre.

Because the cage is guided by the joint inner part, the balls are guided relative to the joint inner part only by the cage. If the constant-velocity ball joint is thus configured, for example, as a plunging joint, the balls are displaced only relative to the joint outer part and not relative to the joint inner part.

In particular, in the case of a straight arrangement of the constant-velocity ball joint, the inner center lines and the outer center lines can run exclusively parallel to a plane comprising the axis of rotation (i.e. with no angle of inclination of the track, which describes an inclination of the center line relative to an axial direction in the circumferential direction).

In particular, the constant-velocity ball joint can be a plunging joint. In particular, the total displacement (i.e. the maximum travel by which the joint inner part can be displaced along the axis of rotation relative to the joint outer part) is at least five millimetres, preferably at least ten millimetres.

The explanations of the constant-velocity ball joint relate in particular generally to proper use or operation of the constant-velocity ball joint (i.e., not to extreme situations which may be provided for mounting or servicing). This means in particular that, for example, the joint outer part, the joint inner part and the balls, as well as the cage which may be present, are positioned relative to each other in an arrangement provided for proper use, for example in an arrangement which lies within the total displacement travel.

In particular, the description of the progression of the at least one inner center line relates to the region of the inner ball tracks in which the balls are arranged in the case of proper use of the constant-velocity ball joint.

The constant-velocity ball joint has at least 6 or 6+n (n=1, 2, 3, . . . ) balls.

A shaft arrangement is furthermore proposed comprising at least the described constant-velocity ball joint and a first shaft connected to the joint outer part and a second shaft connected to the joint inner part.

A motor vehicle is furthermore proposed which has at least a constant-velocity ball joint proposed here. In particular, the constant-velocity ball joint is proposed for use in a passenger car.

The use of indefinite articles ("a", "an") in particular in the claims and the description which reproduces these is to be understood as such and not as numerals. Terms and components introduced thereby are thus correspondingly to be understood such that they are present at least once and can, however, in particular also be present in a multiple.

For the avoidance of doubt, the numerals used here ("first", "second", "third", etc) primarily serve (only) to distinguish between multiple similar objects, sizes or processes, i.e. do not prescribe any dependency and/or sequence of these objects, sizes or processes on or to one another. Should a dependency and/or sequence be required, this is explicitly stated here or is obvious to a person skilled in the art when studying the specific described embodiment.

BRIEF SUMMARY OF THE DRAWINGS

The invention, and the technical background, are explained in detail below with the aid of the drawings. It should be noted that the invention is not limited by the exemplary embodiments. In particular, unless explicitly stated elsewhere, it is also possible to extract subaspects of the content explained in the drawings and to combine them with other parts and insights from the present description and/or drawings. The same reference symbols relate to the same objects such that explanations from other drawings may be used in a supplementary fashion. In the drawings, schematically.

DESCRIPTION

Figures 1, 2, 3, 4, 5:
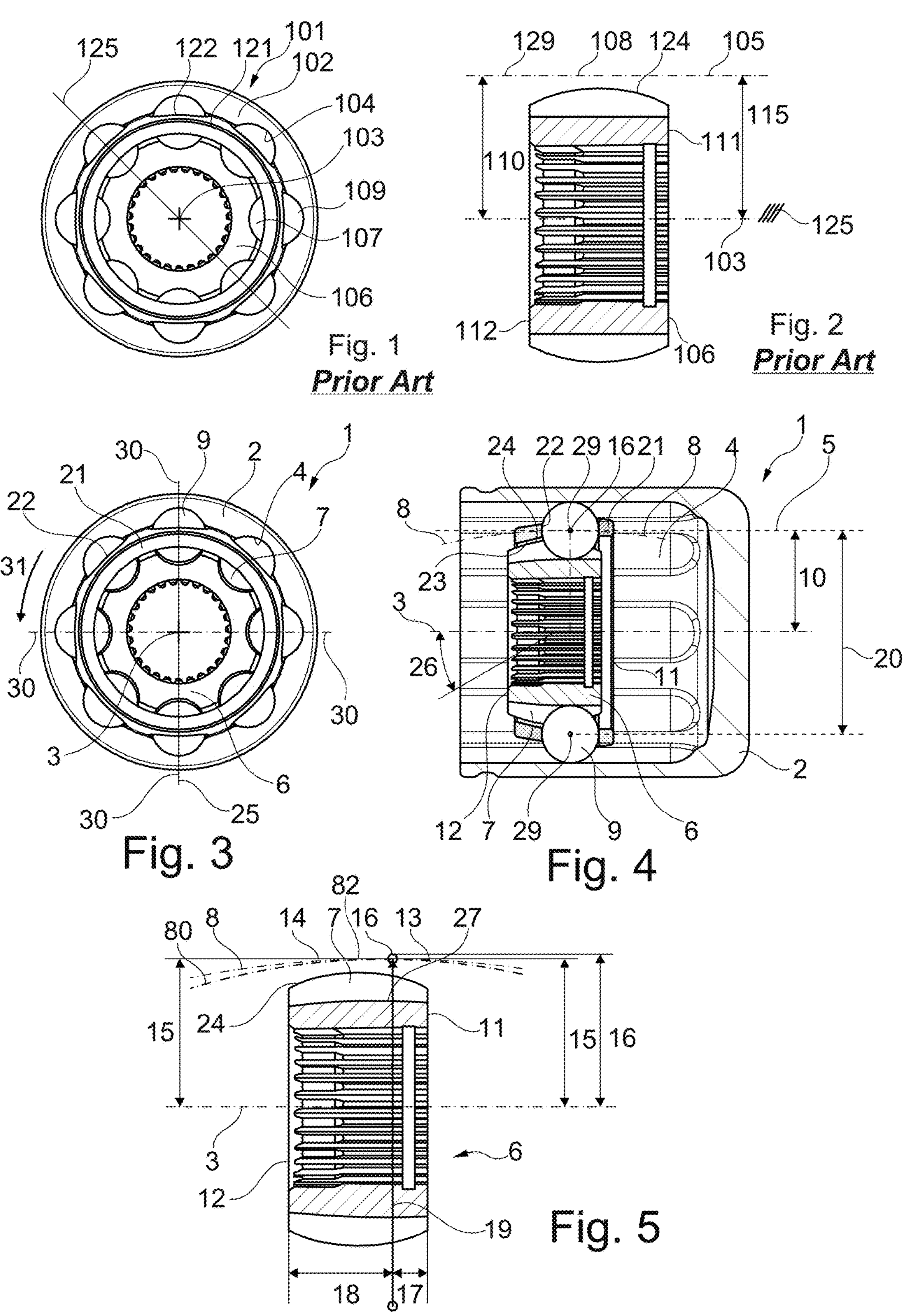
FIG. 1: shows a known constant-velocity ball joint in a straight arrangement in a view along the axis of rotation.
FIG. 2: shows a joint inner part of the constant-velocity ball joint according to FIG. 1 with an inner center line in a side view in section.
FIG. 3: shows a first alternative embodiment of a constant-velocity ball joint on a straight arrangement in a view along the axis of rotation.
FIG. 4: shows the constant-velocity ball joint according to FIG. 3 in a side view in section.
FIG. 5: shows a joint inner part of the constant-velocity ball joint according to FIGS. 3 and 4 with an inner center line in a side view in section.

FIG. 1 shows a known constant-velocity ball joint 101 in a straight arrangement in a view along the axis of rotation 3. FIG. 2 shows a joint inner part 106 of the constant-velocity ball joint 101 according to FIG. 1 with an inner center line 108 in a side view in section. FIGS. 1 and 2 are described below jointly.

The constant-velocity ball joint 101 is a plunging joint. The constant-velocity ball joint 101 has a joint outer part 102 with an axis of rotation 103 and with outer ball tracks 104 and with outer center lines 105. The constant-velocity ball joint 101 furthermore has a joint inner part 106 with inner ball tracks 107 and inner center lines 108. The joint inner part 106 and joint outer part 102 co-rotate. The axes of rotation 103 of the joint parts 102, 106 are arranged coaxially with each other in the straight arrangement of the constant-velocity ball joint 101. When the constant-velocity ball joint 101 is deflected, the axes of rotation 103 of the joint parts 102, 106 are arranged pivoted relative to each other by a deflection angle (see angle 26 indicated in FIG. 4).

The constant-velocity ball joint 101 furthermore has a large number of torque-transmitting balls 109 which are each guided in mutually associated outer ball tracks 104 and inner ball tracks 107. The constant-velocity ball joint 101 furthermore additionally comprises a cage 121 which is provided with a large number of cage windows 122 which each accommodate one of the balls 109.

The cage 121 is guided with a spherical inner circumferential surface 123 (not illustrated) over a spherical outer circumferential surface 124 of the joint inner part 106.

Because the cage 121 is guided by the joint inner part 106, the balls 109 are guided relative to the joint inner part 106 only by the cage 121.

In the case of the straight arrangement of the constant-velocity ball joint 101, the outer center lines 105 and inner center lines 108 run coaxially with one another and the outer center lines 105 are arranged with a constant first spacing 110 from the axis of rotation 103 (see FIG. 2). The joint inner part 106 and the inner center lines 108 extend along the axis of rotation 103 and are arranged with a constant spacing 115 from the axis of rotation 103.

In the case of the straight arrangement of the constant-velocity ball joint 101, the inner center lines 108 and outer center lines 105 run exclusively parallel to a plane 125 comprising the axis of rotation 103 (i.e., with no angle of inclination of the track).

FIG. 3 shows a first alternative embodiment of a constant-velocity ball joint 1 in a straight arrangement in a view along the axis of rotation 3. FIG. 4 shows the constant-velocity ball joint 1 according to FIG. 3 in a side view in section. FIG. 5 shows a joint inner part 6 of the constant-velocity ball joint 1 according to FIGS. 3 and 4 with an inner center lime 8 in a side view in section. FIGS. 3 to 5 are described jointly below. Reference is made to the explanations of FIGS. 1 and 2.

The constant-velocity ball joint 1 is a plunging joint. The constant-velocity ball joint 1 has a joint outer part 2 with an axis of rotation 3 and with outer ball tracks 4 and with outer center lines 5. The constant-velocity ball joint 1 furthermore has a joint inner part 6 with inner ball tracks 7 and inner center lines 8. The joint inner part 6 and joint outer part 2 co-rotate. The axes of rotation 3 of the joint parts 2, 6 are arranged coaxially with each other in the straight arrangement of the constant-velocity ball joint 1. When the constant-velocity ball joint 1 is deflected, the axes of rotation 3 of the joint parts 2, 6 are arranged pivoted relative to each other by a deflection angle 26.

The constant-velocity ball joint 1 furthermore has a large number of torque-transmitting balls 9 which are each guided in mutually associated outer ball tracks 4 and inner ball tracks 7. The constant-velocity ball joint 1 furthermore additionally comprises a cage 21 which is provided with a large number of cage windows 22 which each accommodate one of the balls 9.

The cage 21 is guided with a spherical inner circumferential surface 23 over a spherical outer circumferential surface 24 of the joint inner part 6. There is play between the circumferential surfaces 23, 24. It is therefore possible to displace the cage 21 relative to the joint inner part 6 along the axis of rotation 3 only to a limited extent. Because the cage 21 is guided by the joint inner part 6, the balls 9 are guided relative to the joint inner part 6 only by the cage 21.

In the case of the straight arrangement of the constant-velocity ball joint 1, the inner center lines 8 and outer center lines 5 run exclusively parallel to a plane 25 comprising the axis of rotation 3 (i.e., with no angle of inclination of the track).

In the case of the straight arrangement of the constant-velocity ball joint 1, the outer center lines 5 are arranged with a constant first spacing 10 from the axis of rotation 3.

In contrast to the known constant-velocity ball joint 101 according to FIGS. 1 and 2, in the constant-velocity ball joint 1 proposed here, all the inner center lines 8 extend between a first end 13 present at the first front side 11 and a second end 14 present at the second front side 12 and run with a varying second spacing 15 from the axis of rotation 3. A maximum value 16 of the second spacing 15 is arranged at a distance from the first end 13 and the second end 14.

The inner center line 8 has a convex progression like an arc of a circle, wherein the second spacing 15 of the inner center line 8 reduces, starting from the maximum value 16 and towards the ends 13, 14. An alternate joint may have at least one inner center line 80 (illustrated in FIG. 5) formed by multiple part-shapes, wherein at least one part-shape comprises a straight line (illustrated at 82). In particular, other part-shapes can be formed by curved progressions adjacent to the straight line portion. In particular, individual part-shapes can be connected to one another via in each case a tangential transition.

The inner center line 8 runs along a single radius 19. The radius 19 of the inner center line 8 corresponds to approximately 2.8 times the pitch circle diameter 20 of the balls 9. The pitch circle diameter 20 of the balls 9 is the diameter on which the ball center points 29 (in the case of a straight joint) are arranged (see FIG. 4).

The inner center line 8 runs between the maximum value 16 and the respective end 13, 14 in a monotonically decreasing or strictly monotonically decreasing fashion.

The second spacings 15 present at the ends 13, 14 are of different sizes. The maximum value 16 is arranged in a first distance 17 from the first end 13 and in a second distance 18 from the second end 14. The distances 17, 18 differ from each other.

Figures 6, 7, 8, 9, 10:
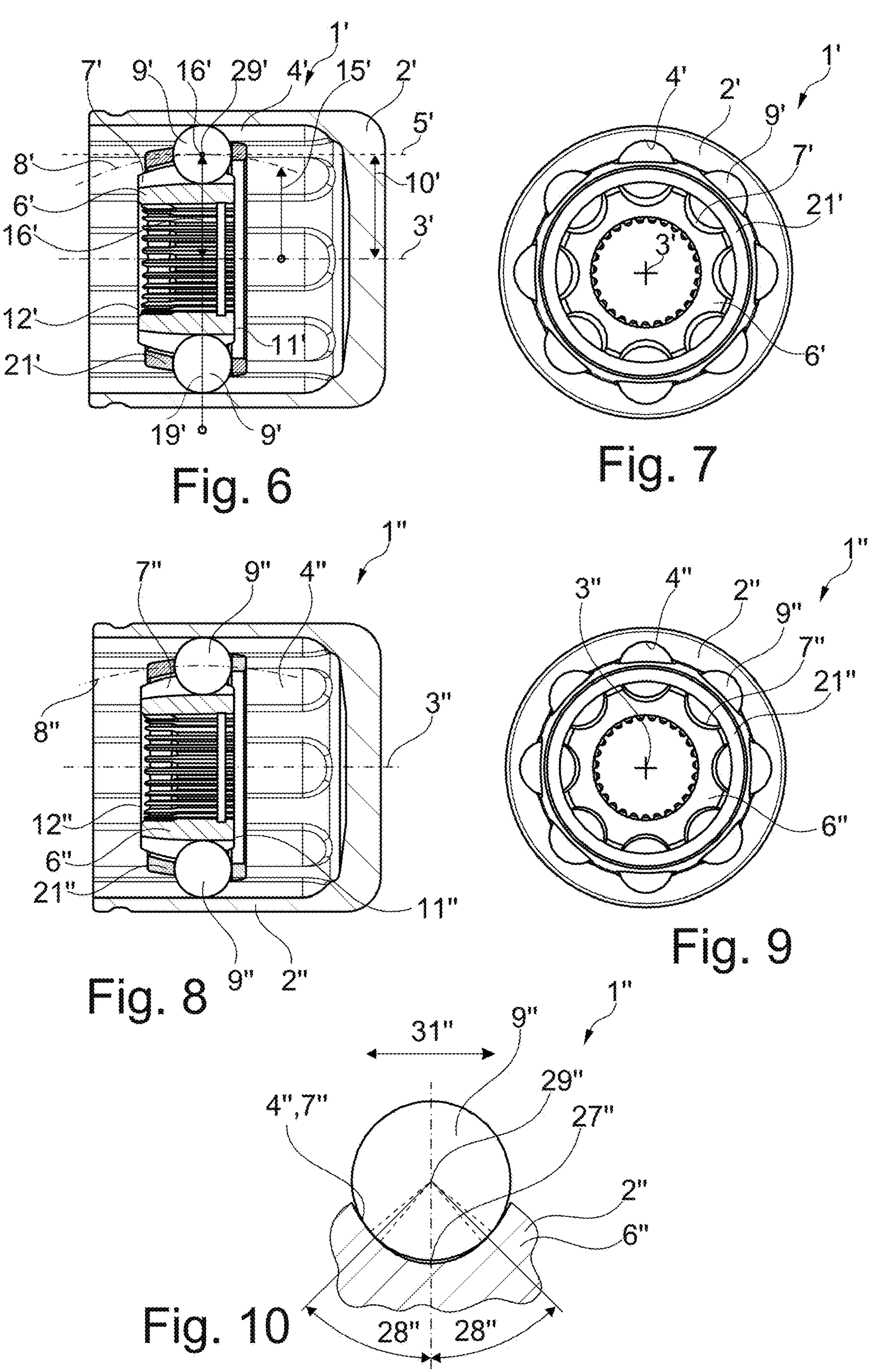
FIG. 6: shows a second alternative embodiment of a constant-velocity ball joint in a straight arrangement in a side view in section.
FIG. 7: shows the constant-velocity ball joint according to FIG. 6 in a view along the axis of rotation.
FIG. 8: shows a third alternative embodiment of a constant-velocity ball joint in a straight arrangement in a side view in section.
FIG. 9: shows the constant-velocity ball joint according to FIG. 8 in a view along the axis of rotation.
FIG. 10: shows a detail of a joint inner part or a joint outer part in a view along the axis of rotation in section.

FIG. 6 shows a second alternative embodiment of a constant-velocity ball joint 1' in a straight arrangement in a side view in section. FIG. 7 shows the constant-velocity ball joint 1' according to FIG. 6 in a view along the axis of rotation 3'. FIGS. 6 and 7 are described jointly below. Reference is made to the explanations of FIGS. 3 to 5. In FIGS. 6 and 7, reference numerals are used for components and features with a prime symbol (')added, and these components and features correspond to the components and features referred to with regard to FIGS. 3-5 with the same reference numeral but without the prime symbol.

In contrast to the first alternative embodiment, a smaller radius 19' is provided in the second alternative embodiment. The radius 19' of the inner center line 8' corresponds to approximately 1.4 times the pitch circle diameter 20' of the balls 9'. In FIGS. 6 and 7, reference numerals are used for components and features with a prime symbol (') added, and these components and features correspond to the same components and features referred to with regard to FIGS. 3-5 and without the prime symbol.

FIG. 8 shows a third alternative embodiment of a constant-velocity ball joint 1" in a straight arrangement in a side view in section. FIG. 9 shows the constant-velocity ball joint 1" according to FIG. 8 in a view along the axis of rotation 3". FIGS. 8 and 9 are described jointly below. Reference is made to the explanations of FIGS. 3 to 7. In FIGS. 8-10, reference numerals are used for components and features with two prime symbols (") added, and these components and features correspond to the components and features referred to with regard to FIGS. 3-5 with the same reference numeral but without the prime symbols.

In contrast to the first and the second alternative embodiments, in the third alternative embodiment a mean radius 19" is provided. The radius 19" of the inner center line 8" corresponds to approximately 2.3 times the pitch circle diameter 20" of the balls 9".

FIG. 10 shows a detail of a joint inner part 6" or a joint outer part 2" in a view along the axis of rotation 3" in section. Reference is made to the explanations of FIGS. 1 to 9.

The ball 9" does not contact the ball track 4", 7" in the region of the track base 27" and instead in the region of the side flanks of the ball track 4", 7". The transmitted torque is applied proportionately to the balls 9" via this region. The position of this region on the side flanks is described by the illustrated force angle 28". The ball 9" has a ball center point 29" which moves along the center line 5", 8" when the ball 9" moves along the ball track 4", 7".

Figure 11:
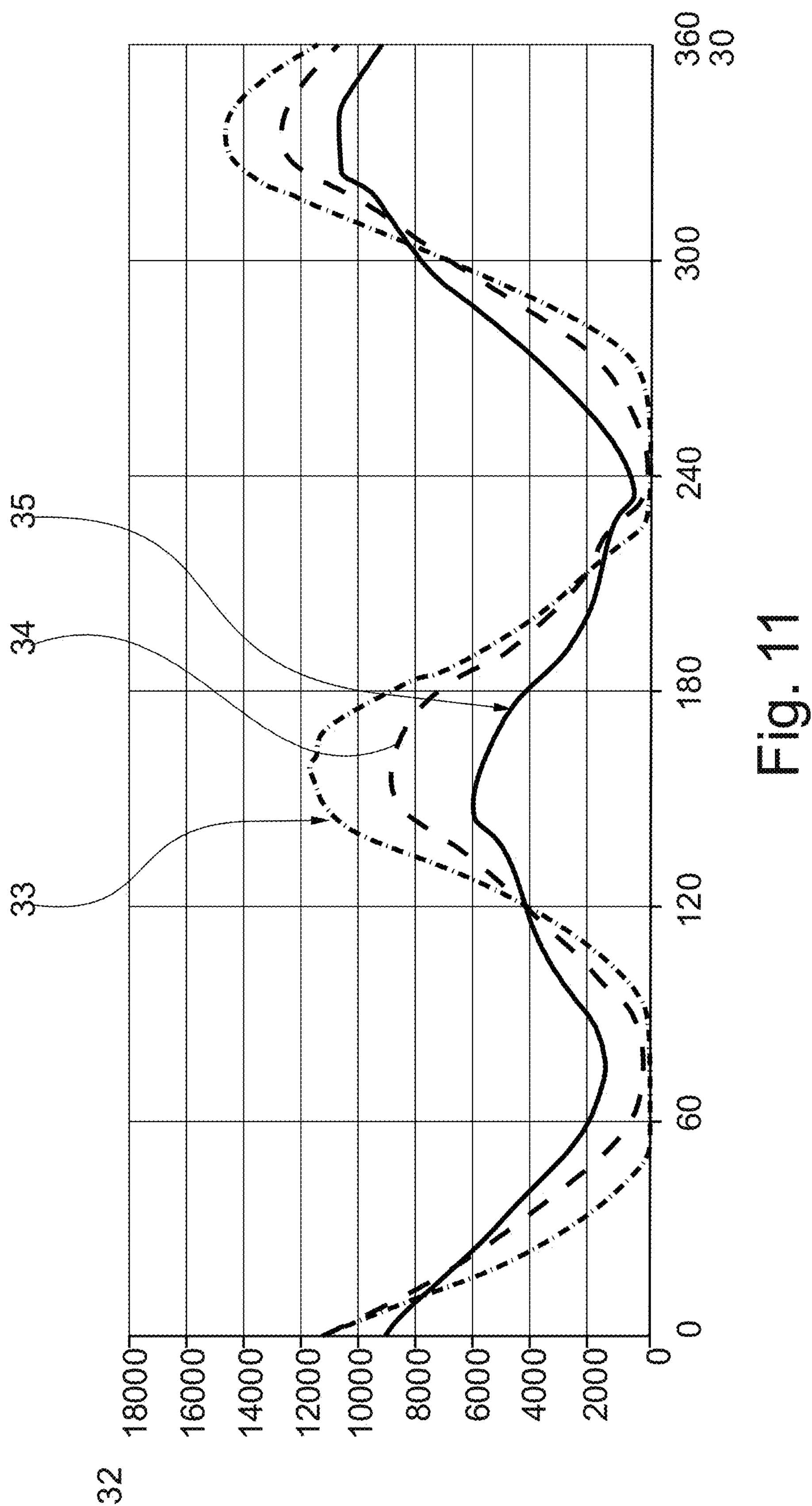
FIG. 11: shows a graph.

FIG. 11 shows a graph. The position 30 in degrees of a ball 9 during a revolution of the constant-velocity ball joint 1 in the circumferential direction 31 is illustrated on the horizontal axis. The force in Newtons transmitted per ball 9 is illustrated on the vertical axis.

For the following explanations, it is defined that the "zero- or 360-degree" position 30 of a ball 9 in the joint 1 is at the top (see, for example, FIG. 3) and the angle then runs anticlockwise in the circumferential direction 31. If the joint 1 is thus at a deflection angle 26 of zero degrees, all the balls 9 are stressed to the same extent and no movement of the balls 9 takes place in the ball tracks 4, 7 in the axial direction 9 (parallel to the axis of rotation 3). When the joint 1 is deflected (it is assumed here that the joint inner part 6 is deflected downwards by 15 degrees, see FIG. 4), the balls 9 move backwards at the "zero-degree" position 30 in the inner ball track 7, and forwards in the joint outer part 2. When the ball 9 reaches the "90-degree" position 30 (on the left in FIG. 3), it is back in the center of the inner and outer ball track 4, 7 and, when it moves on to the "180-degree" position 30 (at the bottom in FIG. 3), the deflection of the balls 9 in the ball tracks 4, 7 is then reversed and the ball 9 migrates forwards in the inner ball track 7 and backwards in the outer ball track 4. When it moves on into the "270-degree" position 30 (on the right in FIG. 3), the ball 9 is then situated back in the central position in the inner and outer ball track 4, 7 (as in the "90-degree" position 30).

As the deflection angle 26 increases over one revolution of the joint 1, an ever more non-uniform force transmission of the ball 9 can be observed, i.e. the force 32 which is transmitted by the ball 9 performs an approximation of a sine wave over the revolution. This oscillation is illustrated as a first curve 33 in FIG. 11. The maximum transmitted force 32 here is, for the same torque, greater than the constant value of the force 32 in the case of an undeflected joint 1 (not illustrated).

It has been shown for constant-velocity ball joints 1 that, when the joint is deflected, the highest stress on the balls 9 occurs in the region of the "zero-degree" and the "180-degree" position 30. A significant homogenization of the stress on the balls 9 can be achieved especially by the shape of the inner center lines 7 which is now proposed.

The second curve 34 illustrated in FIG. 11 shows the homogenization of the force 32 for a constant-velocity ball joint 1' according to the first alternative embodiment. The radius 19' of the inner center line 8' thus corresponds to approximately 2.8 times the pitch circle diameter 20' of the balls 9'. The third curve 35 illustrated in FIG. 11 shows the homogenization of the force 32 for a constant-velocity ball joint 1" according to the second alternative embodiment. The radius 19" of the inner center line 8" thus corresponds to approximately 1.4 times the pitch circle diameter 20" of the balls 9".

LIST OF REFERENCE NUMERALS

1 constant-velocity ball joint
2 joint outer part
3 axis of rotation

4 outer ball track (of the joint outer part)
5 outer center line (of the outer ball track)
6 joint inner part
7 inner ball track (of the joint inner part)
8 inner center line (of the inner ball track)
9 ball
10 first spacing
11 first front side
12 second front side
13 first end
14 second end
15 second spacing
16 maximum value
17 first distance
18 second distance
19 radius
20 pitch circle diameter
21 cage
22 cage window
23 inner circumferential surface
24 outer circumferential surface
25 plane
26 deflection angle
27 track base
28 force angle
29 ball center point
30 position
31 circumferential direction
32 force
33 first curve
34 second curve
35 third curve

The invention claimed is:

1. A constant-velocity ball joint, comprising:
- a joint outer part with an axis of rotation and with outer ball tracks and with outer center lines;
- a joint inner part with inner ball tracks and inner center lines, and
- a plurality of torque-transmitting balls which are respectively guided in mutually associated outer ball tracks and inner ball tracks;
- wherein, in a straight arrangement of the constant-velocity ball joint, the outer center lines run at a constant spacing from the axis of rotation;
- wherein the joint inner part and the inner center lines extend along the axis of rotation between a first front side and a second front side, and at least one of the inner center lines extends between a first end present at the first front side and a second end present at the second front side and runs at a varying second spacing from the axis of rotation;
- wherein a maximum value of the second spacing is arranged at a distance from the first end and the second end, and wherein the constant-velocity ball joint is a plunging joint with the joint inner part being displaceable along the axis of rotation and relative to the joint outer part by at least 5 millimeters.

2. The constant-velocity ball joint of claim 1, wherein the at least one inner center line is curved.

3. The constant-velocity ball joint of claim 1, wherein the at least one inner center line is formed by multiple part-shapes, wherein at least one part-shape comprises a straight line.

4. The constant-velocity ball joint of claim 1, wherein the second spacing at each end is smaller than the maximum value.

5. The constant-velocity ball joint of claim 1, wherein the at least one inner center line runs between the maximum value and the respective end in a monotonically decreasing fashion.

6. The constant-velocity ball joint of claim 1, wherein the second spacings present at the ends differ from each other.

7. The constant-velocity ball joint of claim 1, wherein the maximum value is arranged at a first distance from the first end and at a second distance from the second end, wherein the distances are the same or differ from each other.

8. The constant-velocity ball joint of claim 1, wherein a largest radius of the at least one inner center line corresponds to at least 1.0 times a pitch circle diameter of the balls.

9. The constant-velocity ball joint of claim 1, wherein a largest radius of the at least one inner center line corresponds to no more than fifty times a pitch circle diameter of the balls.

10. The constant-velocity ball joint of claim 1, further comprising:

a cage which is provided with a large number of cage windows which each accommodate one or more of the balls;

wherein the cage is guided with a spherical inner circumferential surface over a spherical outer circumferential surface of the joint inner part.

11. The constant-velocity ball joint of claim 1, wherein, in the straight arrangement of the constant-velocity ball joint, the inner center lines and the outer center lines run exclusively parallel to a plane comprising the axis of rotation.

12. A constant-velocity ball joint, comprising:

a joint outer part with an axis of rotation and with outer ball tracks and with outer center lines;

a joint inner part with inner ball tracks and inner center lines, a plurality of torque-transmitting balls which are respectively guided in mutually associated outer ball tracks and inner ball tracks; and a cage which is provided with a large number of cage windows which each accommodate one or more of the balls;

wherein, in a straight arrangement of the constant-velocity ball joint, the outer center lines run at a constant spacing from the axis of rotation;

wherein the joint inner part and the inner center lines extend along the axis of rotation between a first front side and a second front side, and at least one of the inner center lines extends between a first end present at the first front side and a second end present at the second front side and runs at a varying second spacing from the axis of rotation;

wherein a maximum value of the second spacing is arranged at a distance from the first end and the second end, and wherein the constant-velocity ball joint is a plunging joint with the joint inner part being displaceable along the axis of rotation and relative to the joint outer part, and wherein the cage is guided with a spherical inner circumferential surface over a spherical outer circumferential surface of the joint inner part.

* * * * *